Feb. 3, 1948.  A. E. McPHERSON  2,435,231
ACCELERATION PICK-UP
Filed Aug. 3, 1945

Inventor
Albert E. McPherson,
By Ralph L. Chappell
Attorney.

Patented Feb. 3, 1948

2,435,231

UNITED STATES PATENT OFFICE 2,435,231

ACCELERATION PICKUP

Albert E. McPherson, Bethesda, Md.

Application August 3, 1945, Serial No. 608,821

5 Claims. (Cl. 201—48)

(Granted under the act of March 3, 1883, as amended April 30, 1928; 370 O. G. 757)

This invention relates generally to accelerometers of the electrical resistance type, and particularly to the pick-up component thereof.

The use of fine strain-sensitive wires to measure accelerations is not novel, and the manner of application is fairly obvious. Since the electrical resistance of a metallic wire is proportional to its length and inversely proportional to its cross-sectional area, the increase of resistance of a wire on straining is due to the increase in length, reduction in cross-sectional area, and the change of the coefficient of resistance on straining. For an elastic wire, the strain is proportional to the force applied to the ends of the wire. This force in turn can be made proportional to the acceleration of a mass sprung on the wire. The acceleration is then measured by the change in resistance of this wire. The acceleration recording device is basically a resistance measuring circuit which may conveniently be a Wheatstone bridge with a galvanometer any conventional distance from the accelerometer responsive to current across the bridge.

The principal object of this invention is to provide an electrical resistance accelerometer wherein the pick-up component has strain-sensivtive wires functioning simultaneously as an elastic suspending element and an axial guide. The present pick-ups of this type require guide plates for restraining the motion of the mass to axial direction.

Further objects and features of the invention will be apparent from the following description, taken in connection with the accompanying drawings, in which.

In order to facilitate an understanding of the invention, an embodiment thereof has been shown in the accompanying drawings, and specific language is employed to describe the same. It will nevertheless be understood that no limitation of the invention is thereby intended, and that various other modifications and alterations of the illustrated and described arrangement are contemplated such as embody the principles of the invention and fall within the scope of the claims appended hereto.

Figure 1:
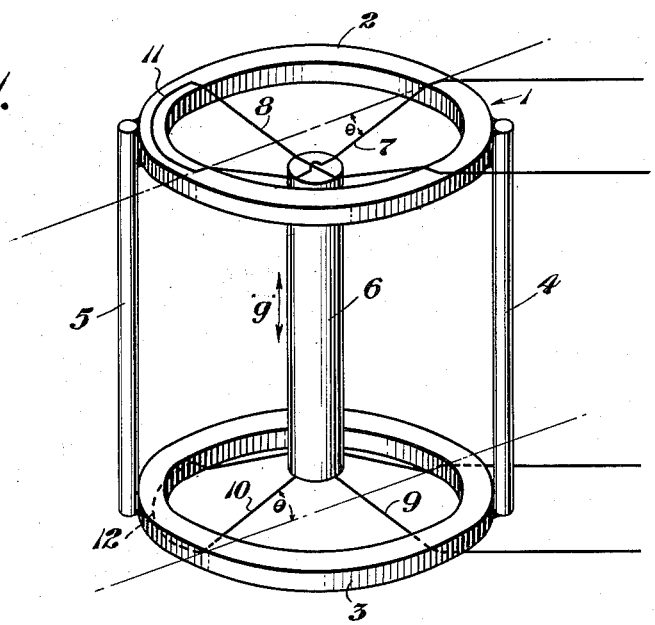
Fig. 1 is an isometric view showing one form of the pick-up device for use in the practice of the invention.

Turning now to Fig. 1, reference character 1 indicates generally an open frame, rigid structure consisting of circular elements 2 and 3 and supporting members 4 and 5 rigidly assembled into a right, circular, cylindrical frame. A cylindrical mass 6, of much smaller dimensions than said cylindrical frame 1, is coaxially positioned intermediate end elements 2 and 3, and elastically suspended from said circular element 2 by means of strain-sensitive wires 7 and 8 cemented thereto, and from element 3 by means of strain-sensitive wires 9 and 10 likewise cemented thereto. Said wires are secured in spaced quadrature on the circular elements 2 and 3 by means of non-conducting cement or any other conventional means. Said strain-sensitive wires 7, 8, 9 and 10, are assembled under an initial tension, and make a suspension angle $\theta$ with the planes of end elements 2 and 3. By this arrangement of wires, all the mass 6 is carried by said wires. Conductor 11 connects wires 7 and 8; conductor 12 connects wires 9 and 10. The dimensions of the wires 7, 8, 9 and 10, the suspension angle $\theta$, and the mass 6 are selected and adjusted so as to result in a change in resistance in said wires proportional to the acceleration of open frame 1.

Figure 2:
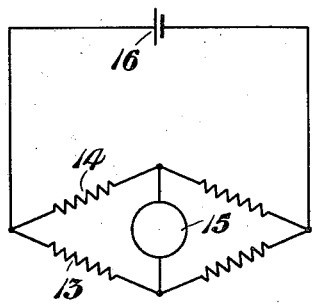
Fig. 2 is a wiring diagram embodying the invention.
Figure 3:
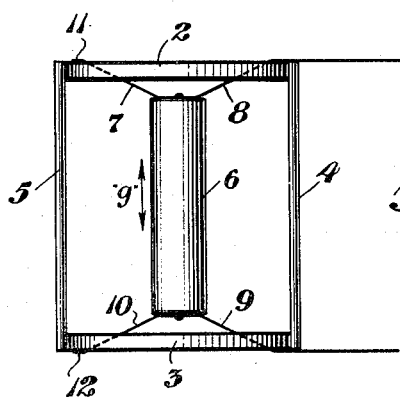
Fig. 3 is a diagrammatic elevational view of Fig. 1.

Fig. 2 is a Wheatstone bridge wiring diagram in which is embodied the above-described pick-up device. The series connected wire elements 7, 8 and 11 comprise one arm 13 of said bridge; the series connected wire elements 9, 10 and 12 comprise an adjacent arm 14 of said bridge. Instrument 15 is connected across said bridge circuit to indicate any potential unbalance. It may, of course, be any resistance measuring device, but conveniently is an instrument typical of those used in measuring or recording strains with electrical strain gages.

Operation

The subject pick-up device is attached to a body, whose acceleration in the directions indicated by the arrow points at "$g$" is sought, and connected into a Wheatstone bridge circuit as shown in Fig. 2. Instrument 15 and current source 16 may be remotely located from said body so as to facilitate the reading or recording of the indicator. The bridge is adjusted to or near a balanced position. Accelerations of said body are transmitted to frame 1, thence to mass 6 through wires 7, 8, 9 and 10. The result is a displacement of mass 6 relative to said body. The force required to accelerate mass 6 upwardly causes wires 7 and 8 to become more taut and wires 9 and 10 less taut. This causes an increase in the electrical resistance of the wires 7 and 8, and a decrease in the electrical resistance of the wires 9 and 10. When the mass 6 is accelerating downwardly, said resistance relationship is of course reversed. The strain-sensitive wires are electrically connected into the Wheatstone bridge circuit so that the effects of said changes in resistances are additive, and the bridge is consequently unbalanced. The change in resistances is then indicated in recording instrument 15. The changes in resistances are proportional to the acceleration of frame 1 in the directions indicated by the arrow points at "g."

Since the mass 6 is suspended from the frame as shown, response to accelerations in directions other than those indicated by the arrow points at "g" or rotations are cancelled out mechanically and/or electrically. In addition, the effects of temperature on the wire are cancelled out. The suspension of mass 6 in the manner disclosed utilizes the strain-sensitive wires as elastic strain elements, and when connected as described produces an unbalance of the bridge proportional to the accelerations only in the directions indicated by the arrow points at "g." The usual guide plates for restraining the motion of the mass 6 to axial direction are thereby eliminated.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention described herein may be manufactured and used by or for the Government of the United States of America for governmental purposes without the payment of any royalties thereon or therefor.

What is claimed is:

1. In an electrical resistance acceleration pick-up: a rigid cylindrical frame structure; a cylindrical mass axially positioned intermediate the ends of said structure; quadrature spaced strain-sensitive wires fixed to the ends of said mass and secured to the corresponding ends of said structure, said mass, suspension angle, and dimensions and tension of said wires being so selected and adjusted as to result in a change in resistance in said wires proportional to the acceleration of said frame structure, said wires being adapted to be connected into a Whaetstone bridge circuit as adjacent arms thereof.

2. In an electrical resistance acceleration pick-up: a symmetrical frame structure; a symmetrical mass axially positioned intermediate the ends of said structure; uniformly spaced strain-sensitive elements suspendably securing said mass to the corresponding ends of said structure, said mass, suspension angle, and dimensions and tension of said elements being so selected and adjusted as to result in a change in resistance in said elements that varies proportional to the acceleration of said structural frame, said elements being adapted to be connected into a bridge network circuit as adjacent arms thereof.

3. In an electrical resistance acceleration pick-up: a frame structure; a mass positioned within said structure; a plurality of elastic strain-sensitive members suspendably securing said mass to said structure and adapted to restrain the motion of said mass to a vertical direction only, said strain-sensitive members being adapted to be connected into a balanced circuit.

4. In an electrical resistance acceleration pick-up: supporting means; a mass; elastic strain-sensitive means securing said mass to said supporting means and adapted to restrain the motion of said mass to one direction only, said strain-sensitive means being adapted to be connected to means for measuring a voltage variable as the stress in said strain-sensitive means.

5. In an electrical acceleration pick-up: a rigid frame structure; a mass positioned within the said structure; symmetrically spaced strain-sensitive elements suspendably securing said mass to the said structure, the said elements being such as to change in electrical property in proportion to the acceleration of the said structure; and means for indicating the change in electrical property of the said elements.

ALBERT E. McPHERSON.

REFERENCES CITED

The following references are of record in the file of this patent:

UNITED STATES PATENTS

| Number | Name | Date |
| --- | --- | --- |
| 1,892,054 | Hinchman | Dec. 27, 1932 |
| 2,391,966 | Harrison | Jan. 1, 1946 |